Figure 4:
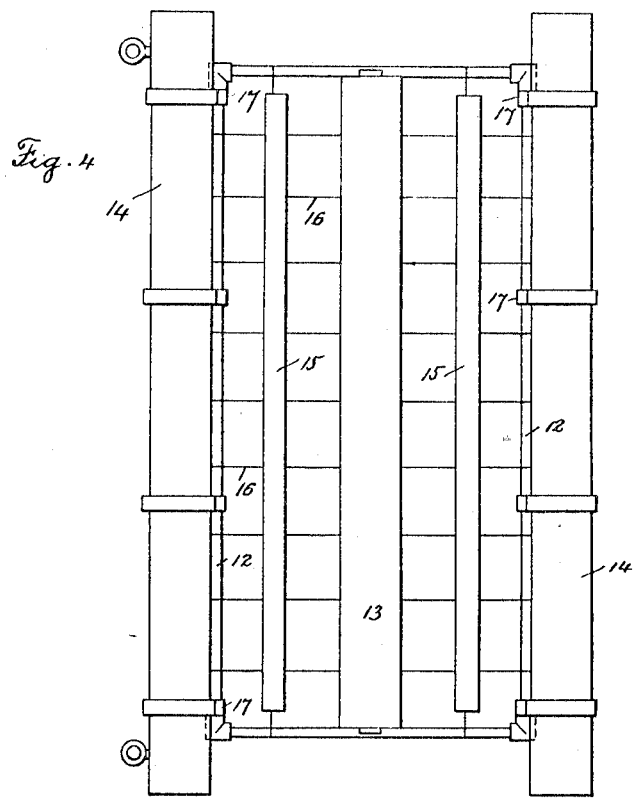

L. TABULO.
LIFE SAVING APPLIANCE FOR USE AT SEA.
APPLICATION FILED FEB. 17, 1914.
1,107,632.
Patented Aug. 18, 1914.
8 SHEETS—SHEET 1.
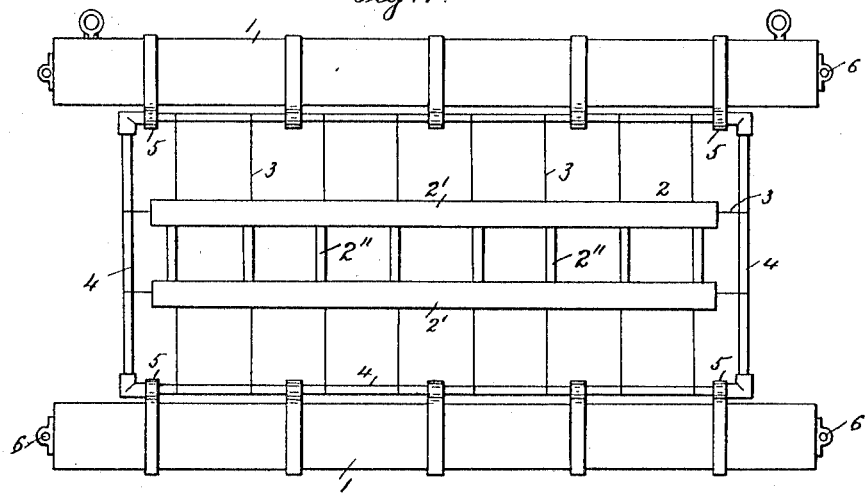
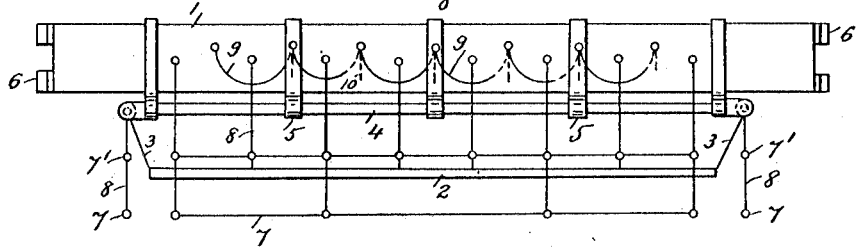
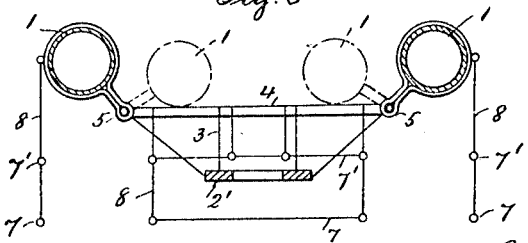

L. TABULO.
LIFE SAVING APPLIANCE FOR USE AT SEA.
APPLICATION FILED FEB. 17, 1914.

1,107,632.

Patented Aug. 18, 1914.
8 SHEETS—SHEET 2.

Witnesses:
Wm N. Bates
H. G. Ruch

Inventor
Louis Tabulo
by Herbert W. Jenner
Attorney

L. TABULO.
LIFE SAVING APPLIANCE FOR USE AT SEA.
APPLICATION FILED FEB. 17, 1914.
1,107,632.
Patented Aug. 18, 1914.
8 SHEETS—SHEET 3.
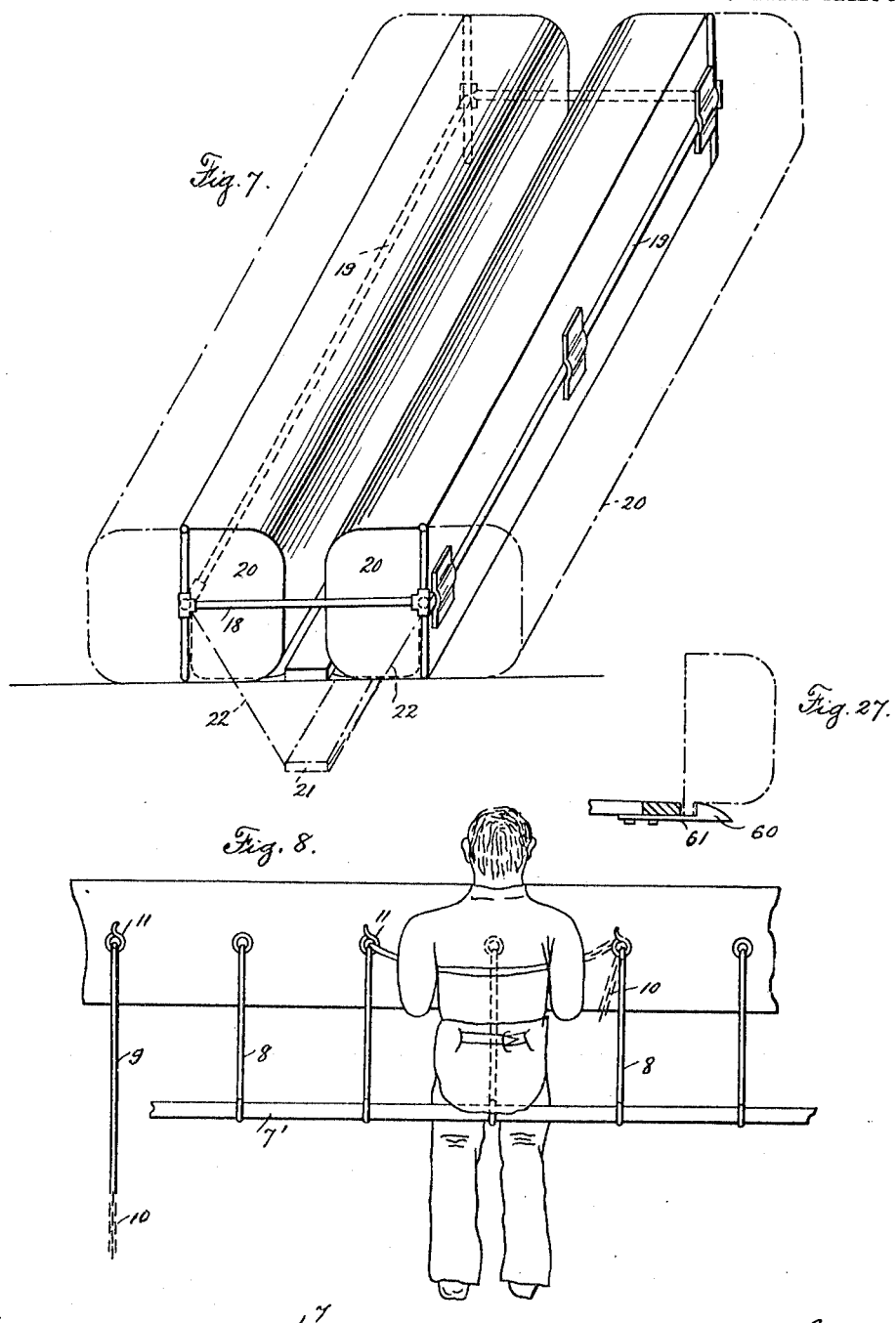

L. TABULO.
LIFE SAVING APPLIANCE FOR USE AT SEA.
APPLICATION FILED FEB. 17, 1914.
1,107,632.
Patented Aug. 18, 1914.
8 SHEETS—SHEET 4.
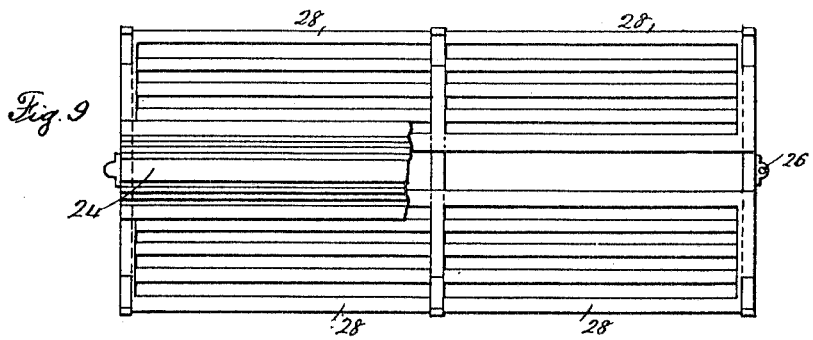
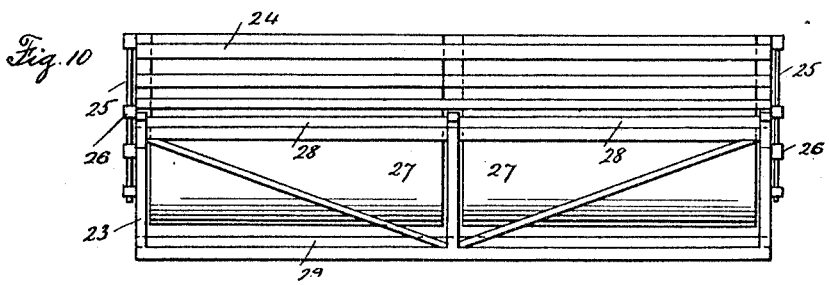
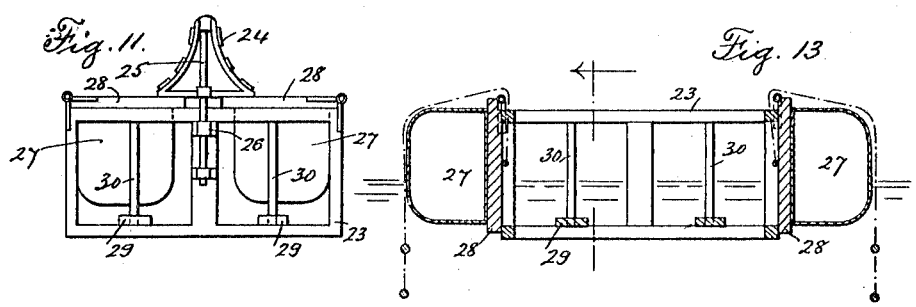
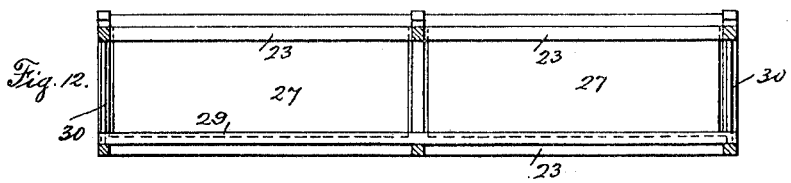
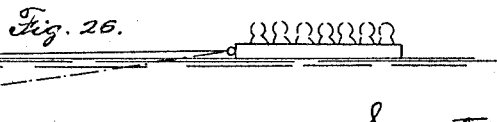

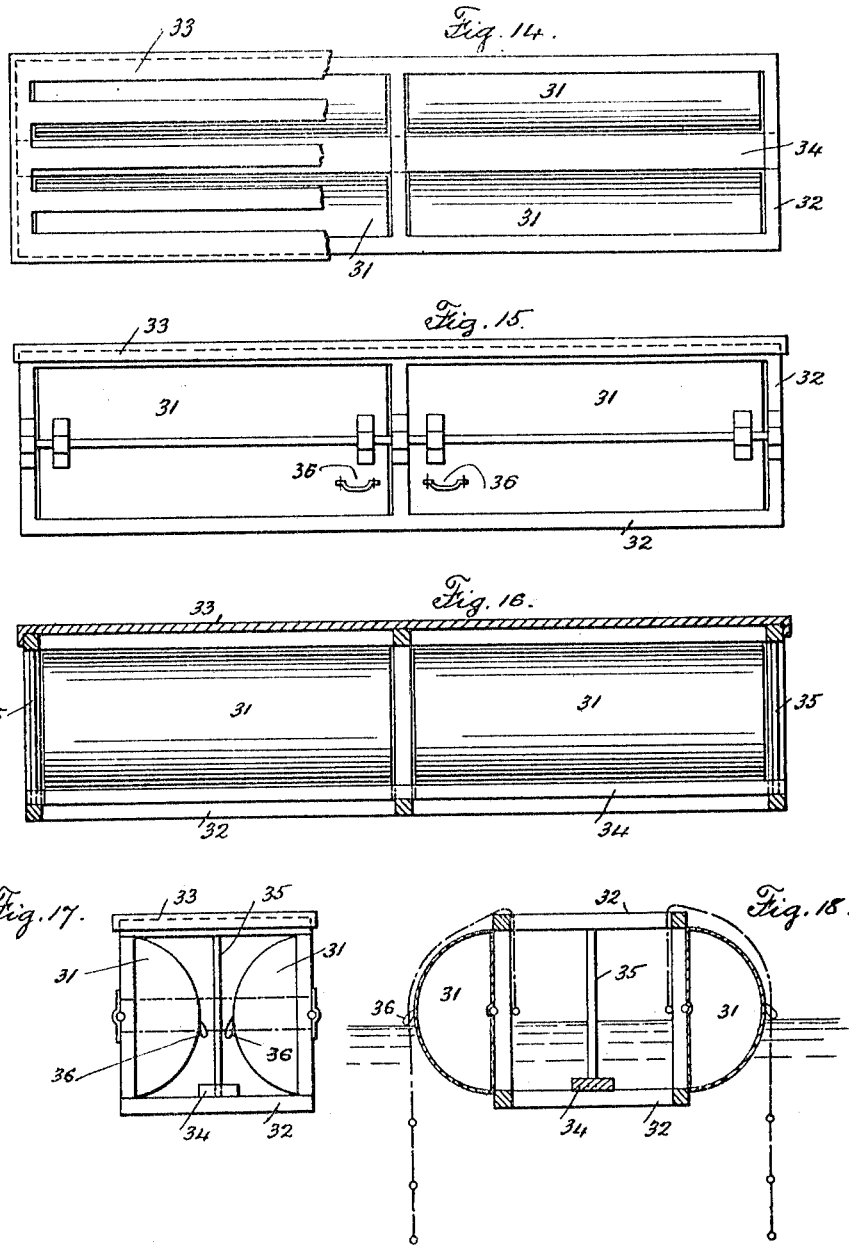

L. TABULO.
LIFE SAVING APPLIANCE FOR USE AT SEA.
APPLICATION FILED FEB. 17, 1914.
1,107,632.
Patented Aug. 18, 1914.
8 SHEETS—SHEET 6.
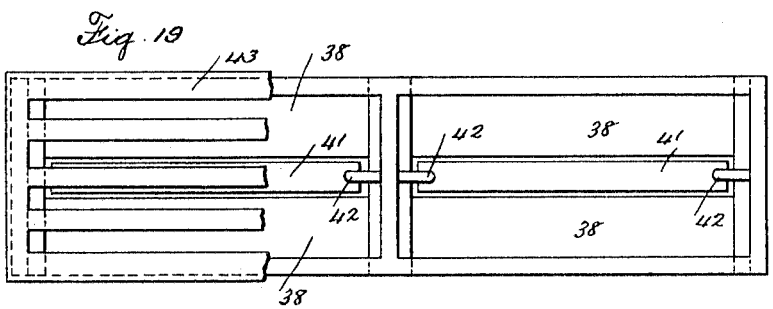
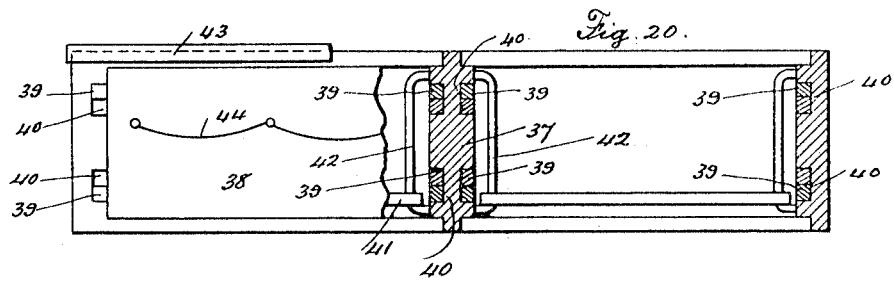
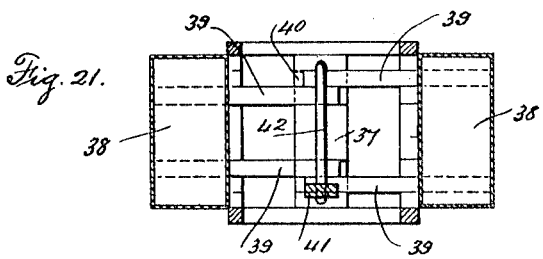

L. TABULO.
LIFE SAVING APPLIANCE FOR USE AT SEA.
APPLICATION FILED FEB. 17, 1914.
1,107,632.
Patented Aug. 18, 1914.
8 SHEETS—SHEET 7.
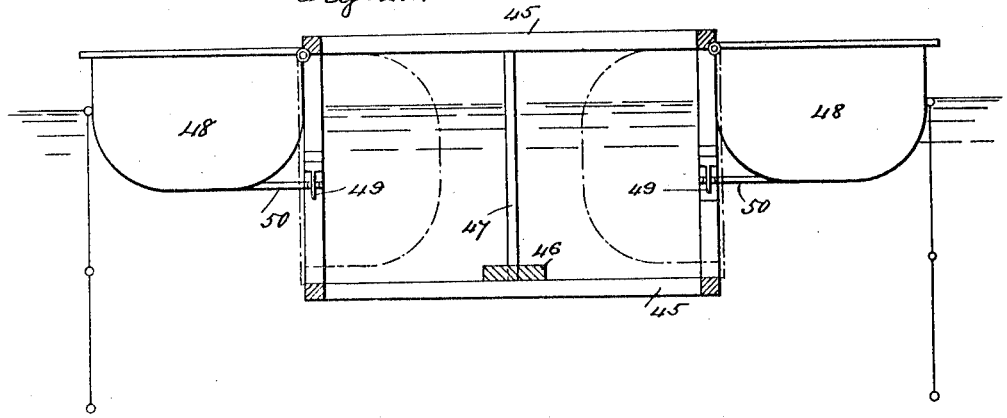
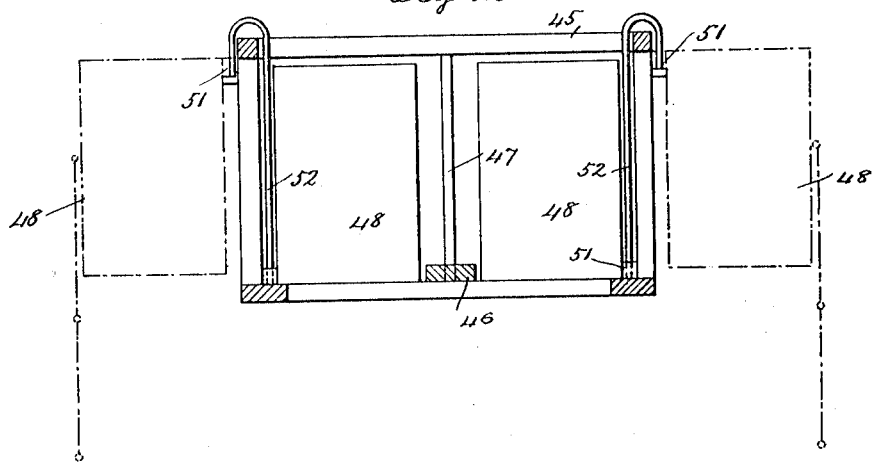

L. TABULO.
LIFE SAVING APPLIANCE FOR USE AT SEA.
APPLICATION FILED FEB. 17, 1914.
1,107,632.
Patented Aug. 18, 1914.
8 SHEETS—SHEET 8.
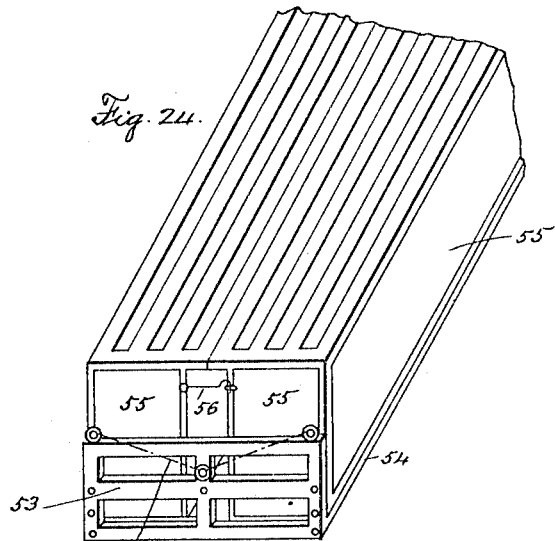
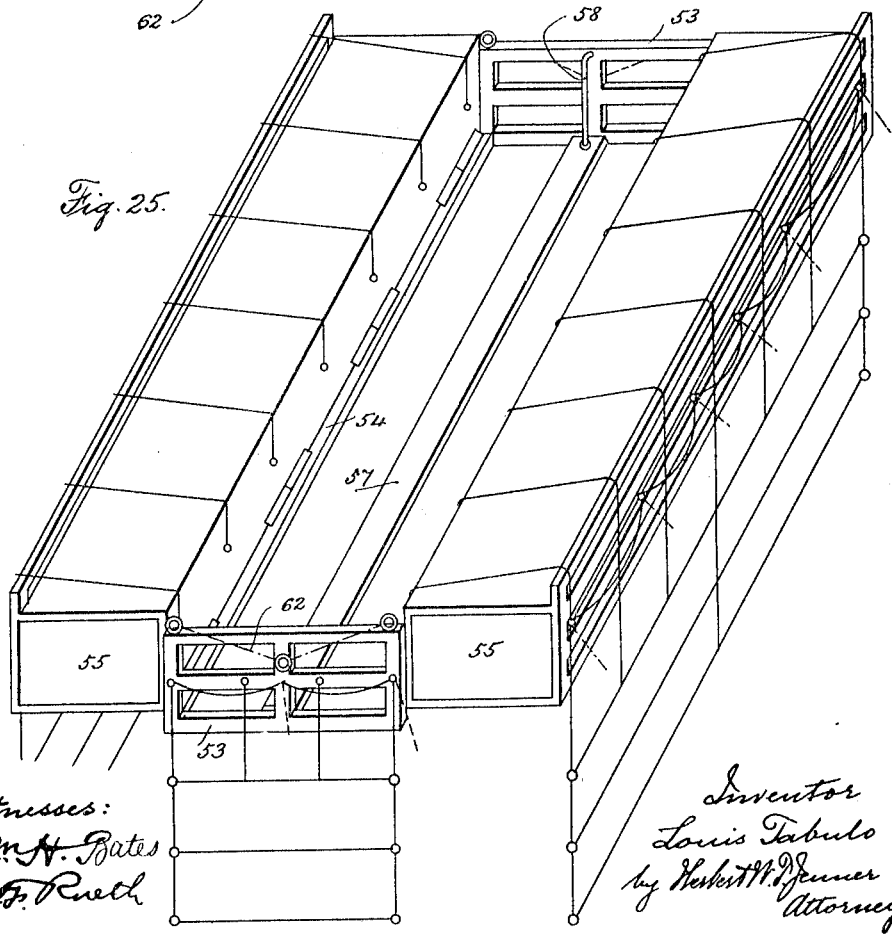

UNITED STATES PATENT OFFICE.

LOUIS TABULO, OF LONDON, ENGLAND.

LIFE-SAVING APPLIANCE FOR USE AT SEA.

1,107,632.  Specification of Letters Patent.  Patented Aug. 18, 1914.

Application filed February 17, 1914. Serial No. 819,244.

*To all whom it may concern:*

Be it known that I, LOUIS TABULO, a subject of the Emperor of Austria-Hungary, residing at 22 Valmar road, Denmark Hill, London, S. E., England, have invented new and useful Improvements in Life-Saving Appliances for Use at Sea, of which the following is a specification.

This invention relates to life-saving appliances for use at sea and consists of improvements which are chiefly intended to be employed on pleasure steamers, coasting vessels and the like, where the space available precludes the possibility of carrying a sufficient number of boats or where the weight of said boats if carried would materially affect the stability of the ship.

The main object of the invention is to so construct life-saving appliances of the semi-submerged type that the persons to be saved will be submerged to a greater extent than in previous constructions of such life-saving appliances, say to an extent such that two-thirds or three-quarters of the bodies of said persons will be immersed in the water, so that the weight to be sustained by the floats or buoyant members of the improved life-saving appliances will be only that of the remaining one-third or one-quarter of their bodies. This object is attained by so constructing a life-saving appliance that the persons using the same will sit astride a narrow batten or frame or frames or battens suspended from the life-saving appliances and located between the buoyant members thereof.

A further object of the invention is to so construct life-saving appliances of the type to which my invention relates that said appliances will be reversible, that is to say the parts thereof will always come into the proper position no matter what may be the manner in which a raft-structure or deck-seat may become water-borne.

A further object of the invention is to increase the carrying capacity of life-saving appliances of the semi-submerged and analogous types, an object which is attained by providing same with foldable ladders or ladder devices adapted when in use to depend from the sides or the sides and ends of the life-saving apparatus.

The invention is illustrated by the accompanying drawings.

Figure 5:
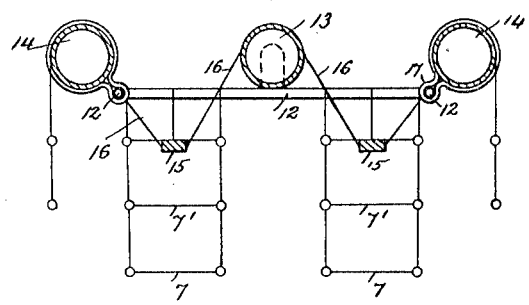
Figure 6:
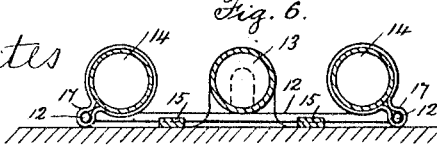

Of these drawings, Figure 1 is a plan, Fig. 2 is a side view and Fig. 3 is a transverse section of a raft-structure according to the invention, in which two floats or buoyant members arranged at the sides of the raft-structure and parallel to one another are used, said floats being, for the purpose of economizing stowage, adapted to fold inward. Fig. 4 is a plan and Fig. 5 is a transverse section of a somewhat similar raft-structure, in which however three floats or buoyant members arranged parallel to one another are used, the center float being fixed and the two outer floats being arranged so as to fold inward. Fig. 6 is a view illustrating the appearance of the same float structure when out of use. Fig. 7 is a perspective view of a further construction of raft-structure. Fig. 8 is a view, drawn to a greater scale than the preceding figures, illustrating the use of the hereinbefore referred to ladders or ladder devices. Figs. 9, 10, 11, 12 and 13 illustrate a double deck-seat constructed in accordance with the invention, Fig. 9 being a plan in which part of the back of the seat is shown broken away, Fig. 10 a side elevation, Fig. 11 an end elevation and Fig. 12 a longitudinal section, while Fig. 13 is a transverse section of the improved deck-seat, the parts thereof being in this figure shown in the positions they would occupy when the deck-seat was being used for life-saving purposes. Figs. 14 to 18 are views, corresponding respectively to Figs. 9 to 13, illustrating a single deck-seat constructed in accordance with the invention. Figs. 19 to 21 illustrate a further construction of single deck-seat, Fig. 19 being a plan, in which part of the top of the seat is shown broken away, Fig. 20 a part side elevation and part vertical section, and Fig. 21 a transverse section, in which the floats or buoyant members are shown in the positions they occupy when in use. Figs. 22 and 23 are vertical sections of further constructions of deck-seats. Figs. 24 and 25 are perspective views illustrating a still further construction of deck-seat. Fig. 26 is a view illustrating how the improved deck-seats may be used in conjunction with a sea-anchor. Fig. 27 illustrates an automatic catch which may be used in the majority of cases.

Referring first to Figs. 1, 2 and 3, a raft-structure according to the present invention may consist of two floats or buoyant members 1, arranged at the sides of the raft-structure, parallel to one another, and of a narrow frame 2 connected by means of ropes or the like 3 to a light tubular frame 4, which is itself connected to the floats or buoyant members 1. The floats or buoyant members 1 may be of any suitable construction, for instance may consist of hermetically sealed casings containing air or bolsters formed of waterproof material and containing cork, kapok, or other suitable buoyant material. The floats are preferably connected to the tubular frame 4 by eyes 5 so that they may, when the raft-structure is not in use, be folded inward, as shown in dotted lines in Fig. 3, and thus minimize the space occupied by each raft-structure. The narrow frame 2 is made of lesser length than the distance between the innermost parts of the end members of the light tubular frame 4, so that the narrow frame 2 can readily pass through the tubular frame 4, thereby enabling the raft-structure to be reversible, that is to say independent of the way in which it becomes water-borne. The narrow frame 2 preferably consists of two boards 2' and cross pieces 2'' which are located at such distances apart as to allow the occupants of the raft-structure to sit astride the boards 2', that is to say with one leg on the outside of a board 2' and the other leg in a space obtaining between two of the cross pieces 2''. The frame 2 could however be replaced by a single batten or board in which case the occupants of the raft-structure would sit astride said batten and the width of the raft-structure would be less than that shown. Any suitable number of ropes 3 may be used, but the number of ropes attached to the boards 2' of the frame 2, or to the single batten, if such is used, would preferably be such as to provide separate spaces for the legs of all of the occupants of the raft-structure. The raft-structure may be provided with eyes 6 for the reception of rowlocks, so that the structure, however it may become water-borne, may be rowed by the occupants.

With a view to increasing the carrying capacity of the above described raft-structures the floats or buoyant members 1 are provided with ladders on which persons in the water may seat themselves. Means are also preferably provided by which said persons may, after they have seated themselves on the rungs of the ladders, secure themselves in position thereon so as to avoid the necessity of having to hold on to the raft-structure and prevent them possibly losing their lives as a result of exhaustion or unconsciousness arising from long exposure.

The ladders, which would extend along practically the whole length of the floats or buoyant members 1 and also, if desired, along the ends of the raft-structures, would be constructed of two or more rungs 7, 7', formed of tubing, and ropes 8, attached to said rungs and to said buoyant members, while the means by which said persons would safely secure themselves in position would consist of ropes 9 attached at one of their ends to said buoyant members and provided at their other ends with suitable lengths of chain 10 adapted to be passed on to hooks 11 fixed to the floats.

The ladders, ladder devices and safety ropes and chains would be used in the manner now to be described with reference to Fig. 8.

A person in the water wishing to save himself by means of one of the ladders would climb on to the lower rung or rungs 7 and seat himself on one of the upper rungs 7' in the position shown in Fig. 8, that is to say with his legs on the two sides of one of the ropes 8. He then detaches from its hook 11 the chain 10 attached to the rope 9 in front of him, and passes said rope under his arms and across his back and attaches the chain 10 to its hook 11.

A raft-structure according to the present invention instead of being constructed as above described may be constructed in the manner shown by Figs. 4, 5 and 6, that is to say may consist of a light tubular or other like suitable frame 12, a central float or buoyant member 13, two side floats or buoyant members 14, and two battens 15 connected by ropes or the like 16 to the tubular frame 12 and to the central float 13. The central float 13 is fixed to the tubular frame 12. The two side floats 14 are preferably connected to the tubular frame 12 by eyes 17 so that they may be folded inward, as shown in Fig. 6. The raft-structure would be provided, see Fig. 5, with the ladder devices and safety ropes and chains described with reference to the raft-structure illustrated by Figs. 1, 2 and 3.

Again a raft-structure may be constructed as illustrated in a more or less diagrammatic manner by Fig. 7, that is to say may consist of a light tubular frame formed of H-shaped end members 18 and side members 19 connected to said end members. The buoyant members 20, which may be two, four or more in number, are pivotally supported on said side members 19, and the central batten 21 on which the persons to be saved would sit astride, would be connected to said side members 19 by means of ropes 22. The normal positions of the buoyant members 20 are indicated in full lines, while the positions which they occupy when the raft-structure is in the water is shown in chain lines.

The raft-structure last described would also be provided, as in the case of the earlier forms of raft-structures, with the ladder devices and safety ropes and chains already described.

Deck-seats according to the invention are constructed on similar lines to the improved raft-structures, that is to say are so constructed that the persons using same will sit astride one or more battens which will always be available for use no matter in what position the deck seat may become waterborne.

Several deck-seats constructed in the manner above described are illustrated by the accompanying drawings.

Referring to the construction of double deck-seat illustrated by Figs. 9, 10, 11, 12 and 13 the deck-seat is constructed of a skeleton box-shaped frame 23 and the back 24 of the seat is removably secured to the skeleton frame or main part 23 of the seat, a suitable arrangement being to provide the ends of the back 24 of the seat with depending rods 25 and the ends of the skeleton frame with eyes 26 for the reception of the depending rods 25. The floats or buoyant members 27 of the deck-seat are secured to the lower surfaces of two flaps 28 hinged to the sides of the skeleton frame 23. These flaps would be retained in their normal positions, on the top of the skeleton frame 23, by means of the back 24 of the deck-seat. The battens 29 on which the persons to be saved sit astride are slidably mounted on rods 30 located at the ends of the skeleton frames 23.

The above described deck-seat would be used in the following manner:—The back 24 of the seat is first detached from the main part of the seat. The flaps 28 are then turned on their hinges until they rest against the sides of the skeleton frame 23, in which position they would be retained by any suitable catches, preferably automatically acting catches.

Referring now to the construction of deck-seat illustrated by Figs. 14, 15, 16, 17 and 18 the deck-seat is constructed on similar lines to the deck-seat illustrated by Figs. 9 to 13. In this case the floats or buoyant members 31 are hinged at their centers to the skeleton frame 32, and the latter is fitted with a removable cover 33 or seat proper, while only one batten 34 is used, which like the corresponding battens of the previous construction of deck-seat are slidably mounted on rods 35. The floats would be provided at their fronts with loops 36, Fig. 15, for facilitating rotation of same from the position shown in Fig. 17 to the position shown in Fig. 18, and catches, preferably automatically acting catches, would be provided for retaining the floats in the position shown in the last referred to figure.

The deck-seat just described would be used in substantially the same manner as the previously described deck-seat, as will be readily understood from a comparison of the two sets of figures.

Deck-seats according to the invention may be constructed in other ways. Further examples of deck-seats are illustrated by Figs. 19, 20 and 21, Fig. 22, Fig. 23, and Figs. 24 and 25.

In the construction of the deck-seat illustrated by Figs. 19, 20 and 21 the floats or buoyant members are shown as being adapted to be partly withdrawn from the skeleton frame or main part of the deck-seat by sliding movements in outward directions. When the floats or buoyant members are adapted to be moved in this manner the deck-seat may be provided at its center with a partition 37 which would divide the seat into two compartments each adapted to receive a pair of floats or buoyant members 38 of rectangular shape in cross-section. Wood slats 39 would be fixed to the sides of the floats or buoyant members 38 and these slats 39 would engage with cut-away parts or grooves 40 formed in the partition 37 and in the end members of the deck-seat. Each of the compartments into which the deck-seat is divided by the partition 37 would be provided with a centrally disposed batten 41 upon which the persons to be saved would sit astride and these battens would be slidably mounted on rods 42 fixed to the partition 37 and to the end members of the deck-seat. The skeleton frame or main part of the deck-seat would be provided with a cover or seat proper 43, while loops 44 would be secured to the outer sides of the floats or buoyant members 38 to enable them to be drawn outward. A suitable arrangement of stops would be provided for limiting the outward movements of the floats or buoyant members 38. The manner in which this construction of deck-seat would be used will be understood from an inspection of the figures.

Referring to the construction of deck-seats illustrated by Figs. 22 and 23 the main parts of the deck-seats consist of skeleton box-shaped frames 45, similar to the corresponding parts of the previously described constructions of deck-seats, and the battens 46, upon which the persons to be saved would sit astride, are slidably mounted on rods 47 fixed in said skeleton frames 45. 48 are the floats or buoyant members, of which two, four or more could be used. These floats or buoyant members are shown in Fig. 22 as being hinged to the skeleton frame 45 or main part of the deck-seat, and are retained in position when withdrawn from said frame by means of automatically acting spring catches 49 engaging with projecting parts 50 attached to the floats or buoyant members 48. In the case of Fig. 23 the floats or buoyant members are provided with eyes 51 and these eyes are slidably mounted on bars 52 fixed to the skeleton frame 45 of the deck-seat. The floats or buoyant members 48 are moved from the positions shown in full lines to the positions shown in dotted lines by passing the eyes 51 along the bars 52.

In the case of the deck-seat shown in Figs. 24 and 25 the skeleton frame or main part of the deck-seat is somewhat modified and consists of two end members 53 connected to one another by longitudinal members 54 which are secured to the lower parts of said end members 53. The floats or buoyant members 55, which are made of rectangular shape, are hinged to the longitudinal members 54 and are retained in their normal position by means of any suitable construction of catch 56. The batten 57 upon which the persons to be saved would sit astride is slidably mounted on rods 58 secured to the end members 53 of the skeleton frame or main part of the deck-seat.

The carrying capacity of deck-seats according to the present invention would be increased by providing same with foldable ladders, ladder or equivalent devices depending from the deck-seats and also with safety ropes and chains by which persons seated on said ladders or the like would be able to secure themselves in position thereon. These ladders or the like are similar in all respects to those used in the case of the raft-structures.

If desired, as shown in Fig. 26, a sea-anchor 59 may be attached to each deck-seat or raft-structure after it has received its full complement.

In all cases the floats or buoyant members or the parts of the raft-structures and deck-seats supporting same would be retained in the positions they occupy by catches, preferably automatically acting catches, when said structures and seats are used for life-saving purposes. These catches may be of various constructions. A suitable form of catch, which could be used in the majority of cases, is shown in Fig. 27. As will be seen from an inspection of this figure the catch may consist of a wedge-shaped piece of metal 60 fixed to the outer end of a somewhat stout resilient metal strip 61.

The improved deck-seats would be launched in any suitable manner, such for instance as by means of davits, winches or other lowering apparatus operated from a suitable part of the vessel. When the deck-seats are intended to be lowered in this manner they may be provided at their ends with lengths of chain 62, as shown in Figs. 24 and 25.

Raft-structures and deck-seats constructed in accordance with the invention possess many advantages. One of the chief advantages they possess is that a large number of people can be saved by a single raft-structure or deck-seat, as will be understood from the following particulars of one of the improved deck-seats.

Assuming that a deck-seat is 2 ft. 6 ins. in width, 1 ft. 10 ins. in height and 8 ft. in length, then such a deck-seat would be capable of accommodating inside the seat six persons seated one behind the other on a single batten. This deck-seat will when opened out be nearly 6 ft. in width, and will then be capable of safely supporting by means of the ladders or the like, suspended from the outside of the deck-seat, fourteen more people, six of whom would seat themselves on each of the ladders or the like suspended from the sides of the deck-seats while two persons would seat themselves on the ladders hanging from each of the ends of the deck-seat. Such a deck-seat when used as a seat proper will accommodate twelve persons seated back to back.

Again the improved raft-structures and deck-seats need not necessarily be launched, as in certain cases where the deck of the vessel is located at but a short distance from the water the persons to be saved could bestride the battens, narrow frames or the like forming the central parts of the raft-structures and deck-seats and walk down chutes or planks into the water. Or after having bestrode said battens or narrow frames they could await the sinking of the vessel. In the same way persons intending to save themselves by means of the ladders or the like on the outside of the raft-structures or deck-seats would be able to get into position and await the sinking of the vessel.

It will be readily understood that in the case of raft-structures I may, if desired, employ a net and connect this net to the light tubular frame which is connected to the floats or buoyant members, and provide this net with a lower rigid tubular frame which is of smaller dimensions than the upper tubular frame and supports a floor, which latter would support battens upon which the persons to be saved would be able to seat themselves.

Having now described my invention what I have invented and desire to secure by Letters Patent in the United States is as follows:—

1. A raft comprising a rectangular frame, floats pivotally connected to the sides of the frame and arranged outside of it, a seat arranged inside the said frame and free to pass vertically through it, and flexible connections which suspend the seat from the side and end portions of the frame.

2. A raft comprising a rectangular frame, floats pivotally connected to the sides of the frame and arranged outside of it, a seat formed of a plurality of narrow boards arranged parallel to each other and having crosspieces secured at intervals between them, said seat being arranged inside the said frame and free to pass vertically through it, and flexible connections which suspend the said seat from the frame.

3. A raft comprising a rectangular frame, floats pivotally connected to the sides of the frame and arranged outside of it, a seat suspended inside the frame, and ladders formed of flexible side portions and rigid rungs and suspended from the outer side portions of the said floats.

4. In deck-seat rafts the combination of a rigid frame fitted with floats adapted to open outward, reversible seating devices carried by said rigid frame, and reversible trapeze or ladder-like devices provided with vertical ropes and adjustable loops for securely holding the people seated on the trapeze or ladder-like devices.

5. Raft-structures, in which as in the case of the deck-seat rafts the greater part of the bodies of the people to be saved must for the purposes of buoyancy and stability be immersed in the water, the combination of a rigid frame provided with floats adapted to open outward, reversible seating devices carried by said frame between the floats, and reversible trapeze or ladder-like devices fitted with vertical ropes and adjustable loops for securely holding people seated on the trapeze or ladder-like devices.

In testimony whereof I have signed my name to this specification in the presence of two subscribing witnesses.

LOUIS TABULO.

Witnesses:
ARTHUR F. ENNIS,
ORLANDO J. WORTH.

Copies of this patent may be obtained for five cents each, by addressing the "Commissioner of Patents, Washington, D. C."